Patented July 2, 1940

2,206,692

UNITED STATES PATENT OFFICE 2,206,692

VISCOSE CEMENT

Jack W. Garrison, Chicago, Ill., assignor to Transparent Package Company, Chicago, Ill., a corporation of Illinois No Drawing. Application July 1, 1937, Serial No. 151,455

1 Claim. (Cl. 134—23.5)

The present invention relates to a cement and more particularly to a novel method of manufacture of the cement and to the novel product. This method and product is primarily adapted for cementing tubes, casings or the like formed from sheets of regenerated cellulose and principally adapted for use as sausage casings and coverings for enveloping and sealing various forms of meats, meat products and other food products.

With a view of forming a cellulose tube such as cellulose sausage casing and the like it has heretofore been attempted to bond the edges of an overlapping cellulose sheet by employing viscose as the bonding means. This was objectionable and impractical as it required chemical regeneration, that is, it was necessary to immerse the cellulose tube after applying the bonding agent in a regenerating bath consisting of a solution, including sodium sulphate and sulphuric acid, then a thorough washing to remove all the salts and acids present and finally drying of the tube. With my cement such tubes can be readily formed by bonding the overlapped edges of such sheets without chemical regeneration, thus eliminating all the foregoing steps and the time, labor and expense incident thereto. It is therefore, an important object of my invention to provide a cement adapted for bonding the edges of cellulose sheets without regeneration.

Another object of my invention is to provide a novel cement and process of manufacture of the cement and of a lapped or bonded tube or casing produced thereby, which cement and process greatly simplifies the manufacture of the product and results in the elimination of caustic and other impurities and by-products from the cement itself with the result that by mere application without other steps a perfect weld and homogeneous seal or bond is formed.

A further object is to provide a novel method of preparing a cement or adhesive suitable for cementing the lapped ends or edges of a cellulose tube or casing whether formed with a longitudinal or spiral seam or lap, or for cementing together separate sheets or laminae of cellulosic material.

A further object of my invention is to provide a continuous method for constructing a tube from pre-formed cellulose sheets and winding the resulting tube directly from the constructing operation upon reels for storage.

Further objects, advantages and capabilities will be apparent or are inherent in the novel product and method of manufacture.

In the preparation of the present novel viscose cement or adhesive, cellulose xanthate is precipitated from its caustic solution, washed well with alcohol and redissolved in water to make as nearly a neutral solution as possible. As one example, I have successfully employed the following steps and approximate proportions in preparing the novel cement. To carry out this novel process in accordance with the specified example, I dilute substantially 200 grams of raw (no maturity) viscose with substantially 200 grams of water. This is then stirred until a practically perfect solution is obtained. This solution is then additionally stirred at a medium speed, preferably by a mechanical stirrer which may be of the eggbeater type or the like, while slowly adding substantially 500 cc. of alcohol. Excellent results have been obtained by adding this alcohol in minute or drop-like quantities so as to cause the mass to go into a soft gel which is broken up into small granules by the stirrer as more of the alcohol is added and so that the final precipitate is grainy and can be very easily washed. I have found that if the alcohol is added too rapidly, a skin is formed which renders it impossible to adequately or thoroughly wash the precipitate.

When all of the substantially 500 cc. of alcohol has been added, as aforesaid, the mass is then stirred at a medium speed for approximately 5 minutes and the liquid is then decanted or strained off through a cloth or filter of suitable mesh. Care should be taken of the relatively solid mass at this stage in order to maintain it in a grainy condition. Next this solid mass is rinsed with approximately 100 cc. of alcohol, the mass being preferably stirred at a medium speed and then it is finally rinsed in a similar manner with substantially 250 cc. of alcohol. This final washing or rinsing should last preferably 10 to 20 minutes after which the precipitate is rinsed with a wash of substantially 250 to 500 cc. of water, during which it is preferably stirred by hand with a rod or the like, in order to remove the excess alcohol. If necessary, this last wash may be repeated, after which the precipitated xanthate is ready for dissolving.

To the precipitate is next added approximately 250 cc. of water and this is then stirred until solution is obtained, after which the solution is strained or filtered through a cloth or the like of suitable mesh. The viscosity of the resultant product or cement may be readily adjusted by the addition of water and the product so prepared is ready for immediate use. This adjustment of the viscosity by the addition of water, is particularly desirable or necessary where the cement is to be automatically or mechanically applied.

I have found it preferable during the various steps of the process, to maintain the temperature below 18° C. This assists in stabilizing the final product and such stability may be further increased by the addition of 3 to 5 drops of 19% caustic. I have also found that the alcohol wash may be kept neutral with $CO_2$ or the like, and can be employed over and over again as a wash.

To produce my cellulosic tube I take preformed cellulose sheets, which may be formed in any well known way and apply to the meeting edges my cement formed as above described while still in an aqueous solution. This cement dispenses entirely with the necessity of chemical regeneration of the tube or any part thereof, including the bonded portion. With my cement, as the cement acts so rapidly in welding the overlapping edges of the sheet the tube thus formed can be continuously advanced in the form of an endless double flat sheet on to a reel ready for use, thus affording a method and means which permits a continuous operation from the initial to the last step of forming the tube and presenting it ready for use.

The action of my cement is such that when applied it spontaneously forms an integral or homogeneous structure with the parent sheets, that is, the bonded material perfectly unites with the parent sheets.

No further washing or neutralization is necessary so that the tube or casing is never wet and no drying process is required. The steps are practically all automatic so that labor, time and expense required to make the necessary bonding is reduced to a minimum.

Although I have set forth above but one example of my novel invention in which are specified certain steps and sequence of steps which I have successfully used in the preparation of the novel cement or adhesive, and I have thereat set forth approximate quantities of alcohol and water employed in the steps of washing and dissolving of the precipitate, it is to be understood that these steps, sequence of steps and quantities or proportions are but illustrative and various changes and modifications may be made without departing from the spirit of the invention. It will be readily appreciated that these may be varied to produce good results, the basic thought being to precipitate out the celulose xanthate from its caustic solution, washing well with alcohol and redissolving the precipitate in water to make as nearly neutral solution as possible. Applicant thus produces a cement which is free or devoid of all uncombined or free sodium hydroxide or caustic.

Having thus disclosed the invention, I claim:

The process of preparing a substantially neutral viscose cement comprising the steps of diluting raw viscose with water, adding alcohol in minute or drop-like quantities to the solution to cause the mass to go to a soft gel and stirring the mass while adding said alcohol to break it up into small granules, filtering the liquid from the mass, rinsing the solid mass so filtered with alcohol, rinsing the precipitate with water to remove excess alcohol, said rinsing steps removing caustic from the precipitate, and dissolving the precipitate so formed in water to provide a cement or adhesive for bonding the lapped edges of a sheet of cellulosic material.

JACK W. GARRISON.